(12) United States Patent
Saccani

(10) Patent No.: US 6,814,011 B2
(45) Date of Patent: Nov. 9, 2004

(54) PLANT FOR THE HOT TREATMENT OF WASTE GASES FROM MUNICIPAL WASTE INCINERATORS

(76) Inventor: Cesare Saccani, Via Nosadella 57, I-40123 Bologna (IT)

(*) Notice: Subject to any disclaimer, the term of this patent is extended or adjusted under 35 U.S.C. 154(b) by 0 days.

(21) Appl. No.: 10/674,407

(22) Filed: Oct. 1, 2003

(65) Prior Publication Data

US 2004/0074424 A1 Apr. 22, 2004

(30) Foreign Application Priority Data

Oct. 17, 2002 (IT) ..................................... GE2002A0096

(51) Int. Cl.⁷ .............................. F23B 7/00; F23B 5/02
(52) U.S. Cl. ...................................... 110/233; 110/209
(58) Field of Search ................................. 110/233, 234, 110/343, 204, 342; 122/4 D, 7 R; 165/104.16

(56) References Cited

U.S. PATENT DOCUMENTS

| 1,825,707 | A |   | 10/1931 | Wagner, Jr. |              |
|-----------|---|---|---------|-------------|--------------|
| 3,645,237 | A | * | 2/1972  | Seth        | ......... 122/4 D |
| 4,699,071 | A | * | 10/1987 | Vier et al. | ......... 110/345 |
| 5,003,931 | A | * | 4/1991  | Huschauer   | ......... 122/4 D |

FOREIGN PATENT DOCUMENTS

| BO | 98A 000050 | 2/1998 |
|----|-----------|--------|
| EP | 0 182 706 | 5/1986 |
| IT | 1299828   | 4/2000 |

* cited by examiner

*Primary Examiner*—Kenneth Rinehart
(74) *Attorney, Agent, or Firm*—Stites & Harbison, PLLC; Marvin Petry

(57) ABSTRACT

Plant for the hot treatment of waste gases from municipal waste incinerators or the like, comprising a first line of taking up hot waste gases for treating in an exit section of a municipal waste incinerator, a one stage or multiple stage fluid bed contained within one or several reactors and invested by the waste gases to be treated, at least one hopper for charging the solid granular material into the reactor or reactors, a cyclone separator at the outlet of the reactor or of the last of the reactors; the treated waste gases exiting from the reactor or reactors being first introduced into said separator and subsequently conveyed, by said first uptake line, toward a final discharge chimney; said first uptake line providing, downstream of said cyclone separator, a second recirculating line moving the waste gases treated by the reactor or reactors, upstream of the reactor or of the first of the reactors, so that by this second line said treated waste gases mix with the waste gases to be treated originating from the uptake section of the incinerator.

18 Claims, 2 Drawing Sheets

US 6,814,011 B2

PLANT FOR THE HOT TREATMENT OF WASTE GASES FROM MUNICIPAL WASTE INCINERATORS

BACKGROUND OF THE INVENTION

The present invention relates to a plant for the hot treatment of waste gases from municipal waste incinerators or the like.

At this time, as is known, there is an ever growing frequency of combined applications, whereby hot waste gases originating from municipal waste incinerators are treated to reduce their polluting emissions and simultaneously used, thanks to their high thermal energy content, for instance in steam plants for generating electrical power. As is also known, said steam plants often employ one or more super-heaters downstream of the boiler producing saturated steam, for the purpose of obtaining superheated steam to be subsequently sent to expand in a steam turbine, coupled with an electric power generator.

A most important problem in this type of applications is represented by the fact that in the municipal waste incinerators treating the waste gases at high temperatures, above 850° C., downstream of the incinerator afterburner, are characterized by very high concentrations of acids and oxides, for instance hydrochloric acid present in volumes of the order of 0.3–3 g/Nm3 and sulfur oxides present in volumes of the order of several hundreds of mg/Nm3. These presences of acids and oxides in the waste gases prevent raising the superheated steam temperature over 350–380° C., so at avoid incurring in super-heater corrosion phenomena primed by higher temperatures, which lead to said super-heaters' failure in the short term, from a few weeks to a few months.

In my previous Italian Patent No. 1,299,828 filed Feb. 3, 1998 and granted Apr. 4, 2000, a circulating fluid bed hot treating reactor of waste gases for the recovery of energy is described. Said reactor is schematically shown in FIG. 1 of the attached drawings, wherein the numeral 101 designate an incinerator afterburner emitting two hot waste gas streams: a first stream is conveyed to the chimney 122 by an aspirator 121 after passing a filtration system 119, while a second stream is conveyed through an aspirating line 102 to a reactor 106. As can be observed, said second stream of waste gases is split into four gas entrance sectors to the reactor 106. In these sectors the waste gases are subjected to a first pre-treatment to knock out certain polluting substances through a dosing device injecting the feeding lines 105 with reagents based on ammonia, urea and/or other materials capable of neutralizing the nitrogen oxides present in the sour waste gases. The waste gases thus pre-treated are then fed to the fluid bed reactor 106 at various levels: the first injection occurs at the lowest level, opposite the chamber 107, the second injection occurs in the region 109 wherein the bed is prevalently fixed, the third injection occurs in the region 111 wherein the fluid bed is prevalently boiling, and finally the fourth injection occurs in the region 112, wherein the fluid bed is prevalently circulating. The fixed bed region 109 is formed by an inert solid granular material resting on a fluidising grid 108. By summing up, the hot gas stream originating from the chamber 107 fluidises, by passing through the grid 108, the bed of granular material of the fixed bed region 109, wherein the first stage super-heater 110 is immersed. At the level of the second injection region 111, where the fluid bed is prevalently boiling, the gaps between the granular material's solid particles are wider, while in the third circulating bed region 112 said gaps are even wider. In the first fixed bed region 109, a heat exchange occurs between the hot waste gases and the steam flowing in the super-heater 110: the granular material contained inside said region 109 serves the function of an intermediate heat carrier between said waste gases and the walls of said super-heater 110, thus preventing the already pre-treated waste gases from coming into intimate contact with the walls of the super-heater 110. This achieves the dual result of heating up the steam flowing in the super-heater, while at least partially preventing the waste gases from directly contacting the super-heater walls 110, and from lowering the temperature of the waste gases which are going to vertically cross the reactor 106 toward the regions 111 and 112, wherein the stages of the super-heater 110 are ever less "protected" by the granular material, because of the fact that, as mentioned, the gaps between the particles of this material are increasing. At the outlet of the reactor 106, the waste gases, which also entrain the fluid bed's lightest particles, are conveyed by the line 113 to a cyclone separator 114, that recirculates the coarsest particles through the line 115 to the reactor 106, while the finest fraction of the same, considered to be exhausted, is removed by an aspirating device 117, that conveys said exhausted particles to the filtration device 119 and hence to the chimney 122.

The above mentioned reactor, assumed to be the state of the art, evidenced the lack of a recirculating system capable of allowing a further exploitation of the waste gases exiting the cyclone separator 114, as they are generally carrying a considerable residual energy content; the presence of complex injection ramifications of the waste gases inside the reactor 106, the high thermal stresses and jumps to which the only super-heater 110 included in the three-stage fluid bed reactor is subjected; and the usage of a waste gas pre-treatment by introducing regents such as ammonia and/or urea into the feedlines to the reactor.

SUMMARY OF THE INVENTION

The purpose of the present invention is to realize a plant for the hot treatment of waste gases from municipal waste incinerators or the like, which would, starting from a reactor of a type outlined in my previous Italian Patent No. 1,299, 828, be capable of: obtaining superheated steam above 400° C., by increasing the efficiency of the electrical energy producing cycle associated with the same, with evident advantages from an economical viewpoint; avoiding the immission into the atmosphere of heavily polluting emissions on the part of the hot waste gases, by effectively knocking out the noxious and corrosive substances contained in said waste gases, with evident advantages from an environmental viewpoint; and moreover, preventing said corrosive substances from reaching the super-heater walls while compromising their duration and operating efficiency.

The above object is achieved by the present invention, through a combination plant for the hot treatment of the waste gases from municipal waste incinerators or the like, comprising a first uptake line of the hot waste gases to be treated from an exit section of a municipal waste incinerator, a single or a multiple stage fluid bed contained within one or more reactors and invested by the waste gases to be treated, at least one hopper for charging the solid granular material to the reactor or reactors, a cyclone separator at the outlet of the reactor or of the last of the reactors; the treated waste gases exiting from the reactor or reactors being first introduced into said separator and subsequently conveyed, by said first uptake line, to a final discharging chimney; wherein said first uptake line, downstream of said cyclone separator, includes a second recirculating line that conveys the waste gases treated by the reactor or reactors, upstream of the reactor or of the first of the reactors, so that by this second line these treated waste gases mix with the waste gases to be treated originating from the incinerator's uptake section.

Moreover, at least one super-heater is placed within the reactor or reactors, which is passed by the steam to be heated and sent to an electrical energy producing cycle.

BRIEF DESCRIPTION OF THE DRAWINGS

Further objects, characteristics and advantages of the present invention will become apparent in the course of the following description of one preferred embodiment of same, shown by way of non-limiting example in the attached drawings, in which.

DESCRIPTION OF THE PREFERRED EMBODIMENT OF THE INVENTION

Figure 1:
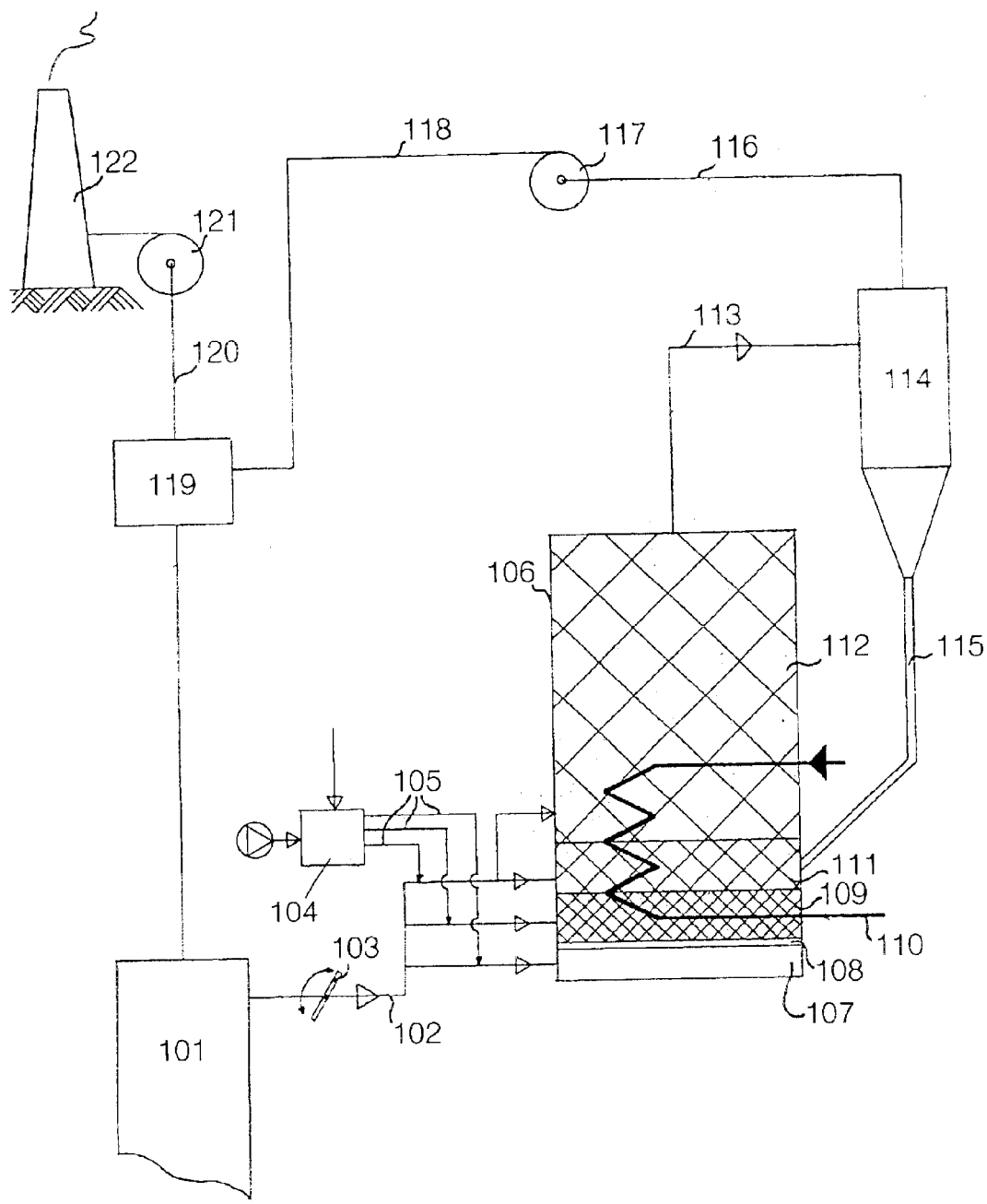
FIG. 1 is a schematic view of the hot treating circulating fluid bed of the waste gases for thermal energy recovery, forming the object of my previous Italian Patent No. 1,299,828.
Figure 2:
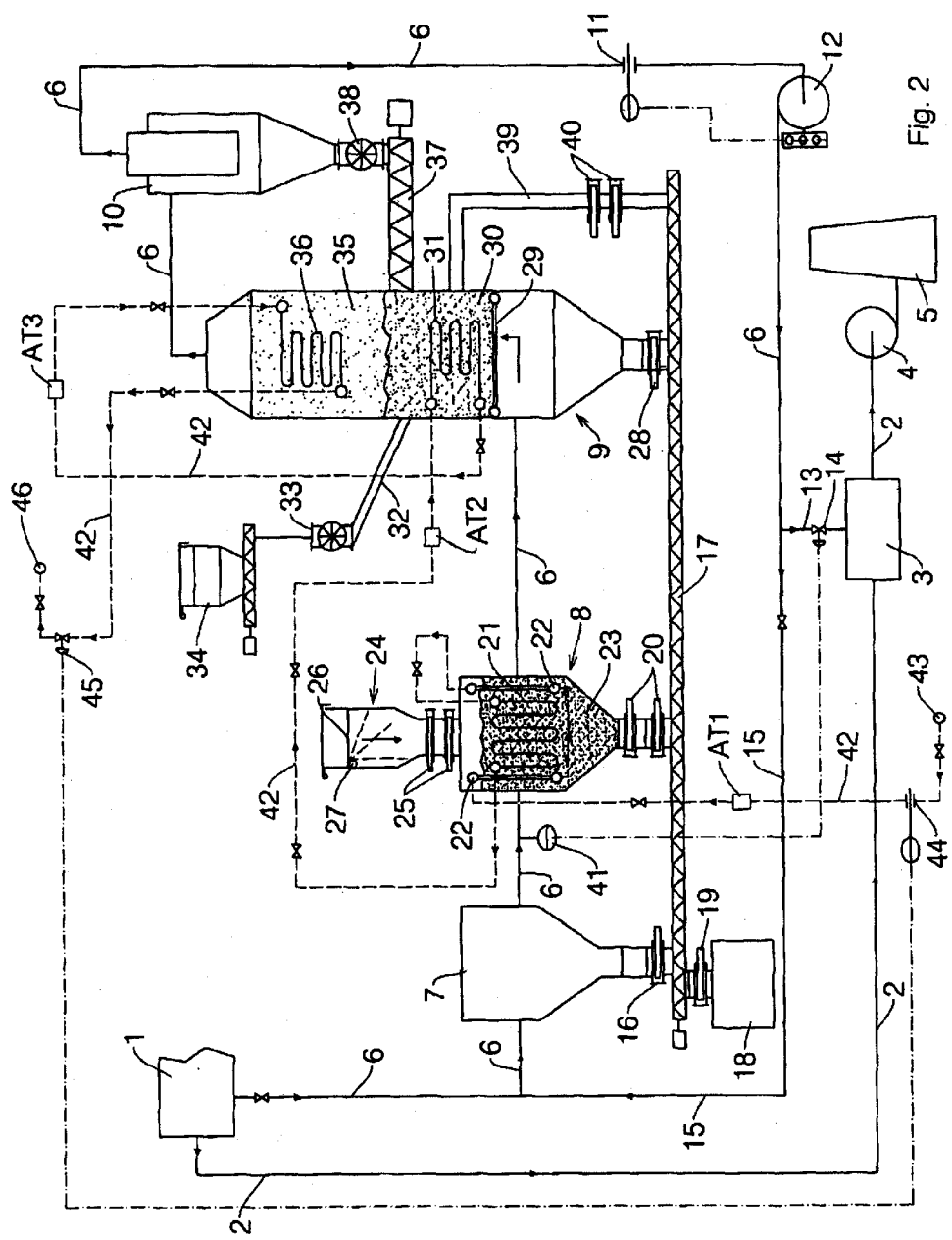
FIG. 2 is a schematic view of a plant for the hot treatment of waste gases from municipal waste incinerators or the like, according to the present invention.

With reference to the FIG. 2 of the attached drawings, 1 illustrates the afterburner of a municipal waste incinerator or a waste gas up uptake area at the highest possible temperature. Two lines of hot waste gases are exiting downstream of said uptake point: a first line 2 that follows the incinerator's normal waste gas path, and a second line 6 comprising a connection 7 to the boiler, a first reactor 8, a second reactor 9, a cyclone separator 10, a flow meter 11 and a compressor 12. Downstream of said compressor 12 the line splits up into two further lines: the line 13 leading to a filtration station 3 which includes a regulating valve 14, and the recirculating line 15, which joins up with the line 6 upstream of the connection 7 to the boiler. Said regulating valve cooperates with a sensor 41 in controlling the hot waste gas temperature in the second section 6 downstream of said connection 7 to the boiler and upstream of the first reactor 8. At its lower extremity, said connection 7 to the boiler comprises a cut-off valve 16, which allows the exhausted solid material to pass over to a lower screw conveyor 17. At the initial left-side extremity below said screw conveyor, a waste material collecting container 18 is provided, which includes a relative upper cut-off valve 19. Following said second waste gas line 6, downstream of the connection 7 to the boiler, the figure shows the first reactor 8, which comprises a lower pair of cut-off valves 20 for discharging the waste material onto said screw conveyor 17. This first reactor 8 is internally equipped with a coil super-heater 21 crossed by steam, two vertical additive containment grids 22 also crossed by the steam, and the first stage 23 of a three-stage fluid bed. This first stage 23 is composed of a fixed bed of solid granular material, in which the first super-heater 21 is immersed. This solid granular material is preferably constituted of calcium carbonate and/or of calcium bicarbonate with the eventual addition of other reagents of a sodium carbonate and/or bicarbonate type or others. The reactor comprises an upper charging hopper 24 for said granular solid material, which is in its lower part equipped with two cut-off valves 25, and opposite its upper extremity with a gate 26 capable of rotating downward through a hinge 27. The second reactor 9 comprises a lower relative cut-off valve 28 communicating with the lower screw conveyor 17 and an internal supporting grid 29 for the fluid bed second stage 30. This second stage 30 is constituted of a boiling bed embedding a second coil-type super-heater 31 crossed by steam. Said boiling bed is formed of a solid granular material, such as calcium carbonate and/or calcium bicarbonate, with the eventual addition of other reagents such as sodium carbonate and/or bicarbonate or others, which is introduced into the second reactor 9 at a certain height through a duct 32 communicating with a rotary valve 33, and thus with a relative charging hopper 34. This solid granular material is fed to the boiling bed second stage 30 at a lower particle size than that used for the first fixed bed stage 23 of the first reactor 8. Above this boiling bed second stage 30, provision is made in such second reactor 9, or in a separate third reactor, for a fluid bed third stage 35. This third stage 35 is constituted of a circulating bed embedding a third coil-type super-heater 36 crossed by steam, and the gaps between the solid granular material particles in said circulating bed are very wide compared with those in the previous beds, and even the size of the particulates falls off as the top of said second reactor 9 is approached, where the outlet of the waste gas second line 6 is provided. This reactor 9 laterally and externally comprises a conveyor belt 37 that collects the coarse material emerging from the cyclone separator 10 through a corresponding rotary valve 38, and recirculates it into the boiling bed second stage 30. Below said conveyor belt 37, the figure shows a duct 39 fitted with relative cut-off valves 40 to discharge the material from the reactor 9 to the screw conveyor 17 and hence to the container 18. The plant according to the invention also provides for a steam line 42, as shown by a dotted line. Such line 42, as can easily be seen by the arrows, starts from a high pressure manifold 43, from which the steam is taken up and led to a low pressure exit steam manifold 46, after crossing the flow meter 44, the two vertical grids 22 of the first reactor 8, the three super-heaters 21, 31 and 36 and a regulating valve 45 cooperating with said steam flow meter 44. This line 42 mounts the attemperators AT1, AT2 and AT3 controlled by temperature probes (not shown) arranged upstream of said attemperators, so that whenever the steam temperature exceeds a pre-established threshold, said attemperators inject water into the steam to adjust its temperature. In the figure, the steam first crosses the grids 22 and then the super-heaters 21, 31 and 36, but the latter may also be crossed in an inverse order (36, 31 and 21), or in a variously arranged order to optimise the super-heaters' skin temperatures.

Therefore, the present plant holds a first hot waste gas line 2 leading directly to the filtration station 3 and hence to the chimney 5, a second waste gas line 6 treated by the reactors 8, 9, a third waste gas recirculating line 15 and a steam line 42. As refers to the fixed bed, boiling bed and circulating bed stages stages 21, 30, 35, respectively, it should be clarified that they could be present all three together or individually, or be variously coupled, depending on the characteristics of the waste gases to be treated when exiting the incinerator, and on the superheated steam temperatures desired. In particular the two boiling bed and circulating bed stages 30 and 35, respectively, may each be separately placed into a respective reactor, rather than both together into the reactor 9, as shown.

The operation of this plant is as follows: all or part of the hot waste gases exiting the incinerator at the highest possible temperature (at least 850–900° C.) are taken up at the point held to be most suitable downstream of the afterburner 1, while passing the second line 6. A temperature control sensor 41 for said waste gases is provided downstream of the connection 7 to the boiler. The waste gas stream of the line 6 is fed into the first reactor 8 and meets the granular material of the fixed bed first stage 23 of the fluid bed. As previously indicated, the waste gases hold acids that are corrosive for the super-heater 21, especially at high temperatures. The first stage 23 of highly compacted solid granular material effectively limits the contact between the outer walls of said super-heater 21 and the waste gases, while the calcium carbonate contained in the bed reacts with the acid present and drops the hydrochloric acid concentration down to about 1,000 m g/Nm$^3$. If the concentration were higher and if the waste gas temperature in this stage were sufficiently high, it would also induce a conversion of the calcium carbonate into carbon dioxide and calcium oxide, which manages to further reduce the highest level of hydrochloric acid present in the waste gases. This latter aspect is most important, because the calcium oxide is extremely reactive with hydrochloric acid, and is difficult to handle and find at low cost. This calcium oxide also tends to crumble into dust, and is thus entrained in the waste gas stream leaving the first reactor 8 and carried outside, to be able to also carry on the reaction in the beds following the first one. In order to enhance the resistance of the super-heaters, in particular of the first super-heater 21 placed in reactor 8 where the waste gases have higher temperatures, these may be made of alloy steel, or may be covered with a thin protective film (coating). The waste gases inside the first reactor therefore release a large part of their heat content to the fixed bed and therefore to the super-heater 21, which carries the flow of steam taken up at about 350°–380° C. from the high pressure manifold 43. At the outlet of this high pressure manifold the steam flow is measured by the flow meter 44 and the relatively cold steam flow is fed into the two vertical grids 22, which serve the purpose of retaining the fixed bed inside the reactor 8. This passage of "cold" steam is necessary, because these grids 22, especially the left one, are invested by the very hot waste gases just spilled from the boiler with the line 6 by the connection 7, and damaging corrosion effects may otherwise arise. The waste gases exiting from the first reactor 8 are conveyed into the second reactor 9 from below, by passing precisely through the grid 29 and thus interacting with the fluid bed second stage 30, in which the gaps between the solid material granules are greater. This waste gas stream is colder compared to the stream that has passed the first reactor 8, there are therefore fewer risks of corroding the super-heaters 31 and 36 while moving up along the second reactor 9, also because the waste gas has already passed through the reagent in the fixed bed. As for the first reactor 8, this waste gas stream exchanges heat with the solid material granules (calcium carbonate and other) and therefore with the super-heaters 31 and 36 crossed by steam, in the overall the waste gases therefore continue passing over heat to the steam, which exhibits a temperature of over 400° C. at the level of the low pressure outlet manifold 46. The treated waste gases have a temperature in the range of 450° C. at the outlet of the second reactor 9 and are fed into the cyclone separator 10, where the heaviest elements of the granular material, which have been entrained with the waste gases into the circulating bed third stage 35, are reintroduced by the conveyor belt 37 into said reactor 9 at the level of the boiling bed second stage 30. The waste gas stream exiting from the top of the cyclone separator 10 is partially conveyed to the filtration station 3 for the final treatment by the line 13, and partially recirculated to the boiler upstream of the connection 7, through the circulating line 15. The type and volume of the waste gases to be recirculated is established based on the temperature that the waste gas stream possesses upstream of the reactor 8, by using the temperature sensor 41 which cooperates with the valve 14; if it is for instance desired to insert the waste gases into the reactor 8 at a temperature of at least 600° C., because the waste gases exiting the boiler connection 7 have a temperature of about 900° C. and the waste gases exiting the cyclone separator 10 have a temperature of about 450° C., the stream entering the reactor 8 may be composed by a third of untreated waste gases at 900° C. and by two thirds of treated waste gases at 450° C. As mentioned before, all the material exhausted from the plant is despatched to the screw conveyor 17 by opening the various cut-off valves 16, 20, 28, 40 provided for this purpose. At the outlet of the three super-heaters 21, 31 and 36 the steam at a temperature of over 400° C. is going to expand, in a well known manner not shown in the drawings, inside a steam turbine coupled to a an electric power generator. With reference to the embodiment exemplifying this plant, as could be noted, the individual super-heaters 21, 31, and 36 are counter-currently (locally) crossed with respect to the waste gas stream, but in the overall, when the steam passes through the line 42 from the super-heaters 21 to 31 and thence to 36, this path is in reality concurrent (global) with respect to the waste gases. As shown, the plant would keep its characteristics and advantages, as acquired by the described operation, unchanged even if the steam took an overall countercurrent path, that is if it first passed the super-heater 36 of the circulating bed third stage 35, then the super-heater 31 of the boiling bed second stage 30, and finally the super-heater 21 of the fixed bed first stage 23, naturally while maintaining the steam entrance from the manifold 43 at high pressure, and its exit from the manifold 46 at low pressure.

As could be verified from the foregoing description, there are multiple advantages, especially in environmental and energy-related terms, to be gained by a hot treating plant of waste gases from municipal incinerators or the like according to this invention, and there are multiple embodiments that may be adopted to obtain these advantages within the scope of the enclosed claims.

I claim:

1. Plant for the hot treatment of waste gases from municipal waste incinerators, comprising a first line of taking up hot waste gases to be treated by an exit section of a municipal waste incinerator, at least a one stage fluid bed contained within at least one reactor and invested by the waste gases to be treated, at least one hopper for charging a solid granular material inside said at least one reactor, a cyclone separator at the outlet of the said reactor; the treated waste gases exiting from the said at least one reactor being first introduced into said separator and subsequently conveyed, by a first uptake line, toward a final discharge chimney; wherein in said first uptake line, downstream of said cyclone separator, provision is made for a second recirculating line that moves the waste gases treated by the said reactor, upstream of the said reactor, so that by this second line said treated waste gases mix with the waste gases to be treated originating from an uptake section of the incinerator.

2. Plant according to claim 1, wherein at least one super-heater is placed inside the waste gas treating reactor, to be passed by steam to be superheated and sent into an electrical energy producing steam cycle.

3. Plant according to claim 1, wherein said fluid bed comprises a first fixed bed stage, a second boiling bed stage and a third circulating bed stage.

4. Plant according to claim 1, wherein the plant comprises, downstream of the waste gas uptake section from the incinerator, a first reactor containing a fixed bed first stage.

5. Plant according to claim 4, wherein the plant comprises, downstream of said first reactor, a second reactor, which contains, from a bottom toward a top, a boiling bed second stage a said circulating bed third stage.

6. Plant according to claim 4, wherein an inside of said first reactor houses a first super-heater passed by steam and embedded in said fixed bed first stage.

7. Plant according to claim 5, wherein an inside of said second reactor houses a second and a third super-heater which are embedded in said second boiling bed second stage and in said circulating bed third stage, respectively.

8. Plant according to claim 4, wherein an inside of said first reactor houses at least one pair of containment grids of said first stage, said grids being essentially vertical and passed by steam.

9. Plant according to claim 1, wherein the plant comprises an uptake connection of the waste gases to be treated, placed downstream of the uptake section of said waste gases from the incinerator.

10. Plant according to claim 1, wherein said uptake section is the afterburner of the incinerator, or a section wherein the waste gases attain the highest temperature.

11. Plant according to claim 9, wherein the plant comprises a temperature sensor housed in said first uptake line of the waste gases to be treated, and situated downstream of said connection and upstream of said first reactor.

12. Plant according to claim 11, wherein said temperature sensor cooperates with a regulating valve provided for the treated waste gas recirculating line, said valve and said sensor being capable of determining the flow rate of the treated waste gases to be mixed with the waste gases to be treated, coming from said first uptake line.

13. Plant according to claim 1, wherein said solid granular material comprises calcium carbonate and/or calcium bicarbonate.

14. Plant according to claim 13, in which to the said calcium carbonate and/or calcium bicarbonate also sodium carbonate and/or sodium bicarbonate are added.

15. Plant according to claim 4, wherein solid granular material is introduced into said first reactor from the top, by a charging hopper provided below at least one shut-off valve.

16. Plant according to claim 5, wherein said solid granular material is introduced into said second reactor at a point corresponding to the boiling bed second stage through a lateral external duct communicating with an upper charging hopper.

17. Plant according to the claim 5, wherein said first and second reactors comprise in a lower and/or lateral position at least one valve for discharging the exhausted material.

18. Plant according claim 1, wherein in said plant, depending on the type of solid granular reagent, its particle size and morphology and the crossing velocity of the waste gases relative to the fluid bed, a mechanical shielding of a coil is achieved by the ability to vary the ratio between a surface directly facing the waste gas and a surface facing a reagent, in accordance with the operating requirements.

* * * * *